(12) United States Patent
Imperiali (10) Patent No.: US 6,463,483 B1
(45) Date of Patent: Oct. 8, 2002

(54) LOW LATENCY INPUT-OUTPUT INTERFACE

(75) Inventor: Steven Robert Imperiali, Endwell, NY (US)

(73) Assignee: BAE Systems Controls, Inc., Johnson City, NY (US)

(*) Notice: Subject to any disclaimer, the term of this patent is extended or adjusted under 35 U.S.C. 154(b) by 0 days.

(21) Appl. No.: 09/487,846

(22) Filed: Jan. 19, 2000

(51) Int. Cl.[7] .............................................. G06F 13/38

(52) U.S. Cl. .............................. 710/35; 710/33; 710/22; 710/27; 710/305; 710/306; 710/307; 710/308; 710/311; 710/312

(58) Field of Search ...................... 710/22, 27, 33–35, 710/66, 305–308, 311–315

(56) References Cited

U.S. PATENT DOCUMENTS

| 5,191,653 A | * | 3/1993 | Banks et al. ................... 710/11 |
| 5,450,551 A | * | 9/1995 | Amini et al. ................ 710/119 |
| 6,353,867 B1 | * | 3/2002 | Qureshi et al. ............. 710/305 |
| 6,393,500 B1 | * | 5/2002 | Thekkath ..................... 710/11 |

* cited by examiner

Primary Examiner—Jeffrey Gaffin
Assistant Examiner—Ilwoo Park
(74) Attorney, Agent, or Firm—Geoffrey H. Krauss; William H. Meise (57) ABSTRACT

A computing or processing system including a microprocessor and a memory coupled together by a local bus, and also includes a north bridge providing translation to a PCI or other standard bus. The system also includes a device bus, which may or may not be coupled to the PCI bus by a south bridge. A device bus interface bypasses the north and south bridges, to provide a single-step interface to the device bus. This reduces the latency.

2 Claims, 4 Drawing Sheets

LOW LATENCY INPUT-OUTPUT INTERFACE

FIELD OF THE INVENTION

This invention relates to control of device buses in processor systems.

BACKGROUND OF THE INVENTION

In microprocessor systems, it is common to interconnect the microprocessor and memory subsystems by way of a parallel local bus. At the current state of the art, a 64-bit local bus is common. In order to make connections between the microprocessor/memory arrangement and the outside world, a "north bridge" interfaces the local bus to an industry-standard bus, such as a PCI bus. The PCI bus allows attachment of standard cards to the system, for purposes such as video and audio interface, printers, scanners, and the like. In addition to standard cards, it may be desirable to provide an interface to other devices, such as programmable timers, additional memory, interrupt controllers, and the like, which do not adhere to any particular standard. These additional devices are ordinarily coupled to a "device" bus, which is interconnected with the PCI bus by way of a "south bridge." These prior-art systems are widely used and successful.

However, it has been noticed that for some applications, the data throughput is less than desired.

SUMMARY OF THE INVENTION

An interface arrangement according to the invention is for attaching peripheral devices on a device bus to a microprocessor $2^N$-bit local interface bus, where the local interface bus is associated with a north bridge for interfacing a PCI bus to the local interface bus, and may also be associated with a south bridge for interfacing the device bus to the PCI bus. The interface arrangement includes a transfer multiplexer/demultiplexer having a $2^N$-bit parallel first port coupled to the local interface $2^N$-bit bit bus for receiving $2^N$-bit data, and for also receiving transfer size information relating to the $2^N$-bit data. The transfer multiplexer/demultiplexer also includes a parallel second port having no more than $2^{N-1}$-bits, and further includes a transfer control input port for transferring data between the first and second ports in a time-division multiplex manner under the control of a transfer initiate signal applied to the transfer control input port, a burst count signal, a data direction signal, and a device port size signal. A local bus address decoder is coupled to the local interface bus, for receiving the local address from the microprocessor by way of the local interface bus, and for decoding the local address to determine if the transfer is to/from a device which is attached to the device bus, and if the local address provides access to such a device coupled to the device bus, signalling, by way of the local interface bus, to the microprocessor that the local bus address decoder is assuming control of the transfer associated with the local address, and, if the local bus address decoder is handling the transfer, further decoding the local address to determine the accessed width of the port of the device, to thereby produce the device port size signals. The interface arrangement further includes a transfer size decoder coupled to the local interface bus, for receiving transfer size information relating to the transfer, and also coupled to the local bus address decoder for receiving the port size signals. The transfer size decoder generates a maximum burst count value in response to the quotient of the transfer size divided by the port size, and also generates a step value by addressing a look-up table with the port size, to access prestored values in the look-up table. The prestored values of step size are equivalent to the byte width of the addressed device port. A burst counter is coupled to the transfer control port of the transfer multiplexer/demultiplexer, and to the local interface bus for receiving the local addresses, to the transfer multiplexer/demultiplexer, and is also coupled to the transfer size decoder, for receiving the maximum burst count and the accessed one of the prestored step values. The burst counter performs the following steps:

(a) loading or latching the three least-significant bits of the local addresses into a counter;

(b) following the loading step, transferring the three bits contained in the counter, in parallel, together with the remaining most-significant bits of the local address, also in parallel, to the device bus;

(c) following the transfer of the three bits and the most-significant bits to the device, generating the transfer initiation command for application to the transfer multiplexer/demultiplexer;

(d) after generation of the transfer initiation command, incrementing the counter by the value of the accessed one of the prestored step values; and (e) repeatedly generating another transfer initiation command and again incrementing the counter, for one less than the number of times specified by the maximum burst count.

The interface arrangement also includes a local microprocessor controller or interface coupled to the local bus, for receiving at least local read and write strobes. The local microprocessor controller also includes a transfer complete strobe signal input port. The local microprocessor controller decodes the read and write strobes to generate a data direction signals representing the direction of data flow through the interface arrangement, and also generates, on the local interface bus, a local acknowledge signal representing completion of data transfer. The interface arrangement further includes a device interface controller coupled to the device bus for receiving device transfer acknowledge signals, coupled to the local microprocessor controller for receiving the data direction signals, and also coupled to the burst counter for receiving the transfer initiate signals. The device interface controller drives the device bus with device control signals in response to the direction control and transfer initiate signals, and produces the transfer complete signals in response to the device transfer acknowledge signals.

DESCRIPTION OF THE INVENTION

Figure 1:
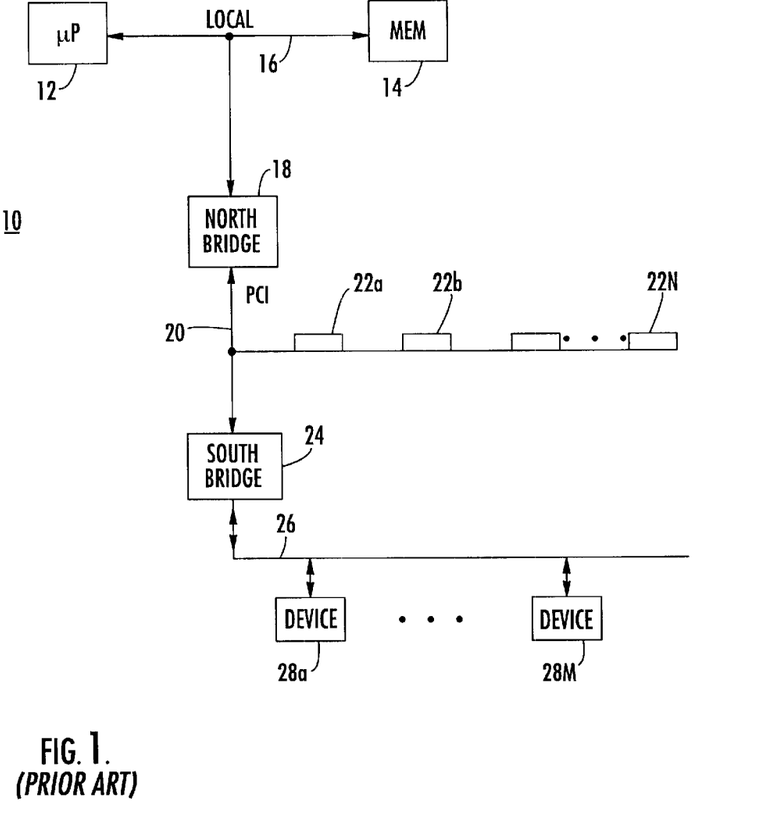
FIG. 1 is a simplified block diagram illustrating a prior-art computer architecture.

In FIG. 1, a computer system 10 includes a microprocessor ($\mu$P) 12 connected to a memory 14 by way of a local bus 16. The local bus is designed for very high operating speed in order to maximize the throughput of the computer. A north bridge 18 connects to local bus 16, and interfaces the local bus with a standard bus, such as a PCI bus 20. PCI bus 20 is coupled to a plurality of card sockets, designated 22a, 22b, . . . , 22N, which are adapted to accept industry-standard cards for interconnecting functions such as video and audio interfaces, printers, scanners, and the like. As mentioned, the computer system may also include nonstandard devices such as programmable timers, additional memory, interrupt controllers, and the like. These nonstandard devices are illustrated as blocks 28a, . . . , 28M, and are illustrated as being connected by way of a south bridge to the PCI bus.

In operation of the system of FIG. 1, information to be processed is read from a source, such as device 28a during a frame interval defined by the duration of an iteration interrupt signal. In general, the duration of the iteration interrupt signal is fixed for a given system. During the defined frame interval, the microprocessor 12, in conjunction with memory 14, and with both running at the frame interval, commands transfer of information to or from a peripheral device. The north bridge receives the commands, and translates the commands to PCI standard. The command appears on the PCI bus, and is received by the south bridge. The south bridge, in turn, processes the commands, and translates the commands into device-specific commands, which are relayed over the device bus 26 to the selected device. When the commands are received by the device, it processes the commands, and responds with the selected information. The selected information traverses the south bridge and is presented to the PCI bus, and then is processed by the north bridge for presentation to the local bus, and eventually becomes available to the microprocessor.

It has been found that, for some applications, the throughput is less than desired. The use of faster microprocessor and associated memory may improve the throughput, but at some point, improving the microprocessor speed gives no further throughput improvement. The speed of the north bridge can be improved, but this entails an increase in the speed of the PCI bus of FIG. 1. When the maximum standard speed of a PCI bus (currently about 66 MHz) has been reached, no further improvement of the north bridge is possible. A faster south bridge can similarly be used to interface with the higher PCI bus speed, but the device bus speed cannot be increased, because it is limited by the characteristics of the attached devices. At some point the cost of speed improvements in the bridges becomes prohibitive. The maximum data throughput, when all possible speed improvements has been made, is the amount of data which can be transferred through the bridges in one frame interval.

It has been discovered that the maximum throughput depends not only on the speed of the north and south bridges, but also on the latency or delay of those devices. According to an aspect of the invention, the data throughput is improved by bypassing the cascade of north and south bridges by a single interface. This allows data to flow with but a single latency, rather than with the cascade of the latency of the north bridge plus the latency of the south bridge. For equivalent interface speeds, the reduction in latency provides an improvement of data transfer during each frame which equals the interface speed multiplied by the duration of one latency.

Figure 2:
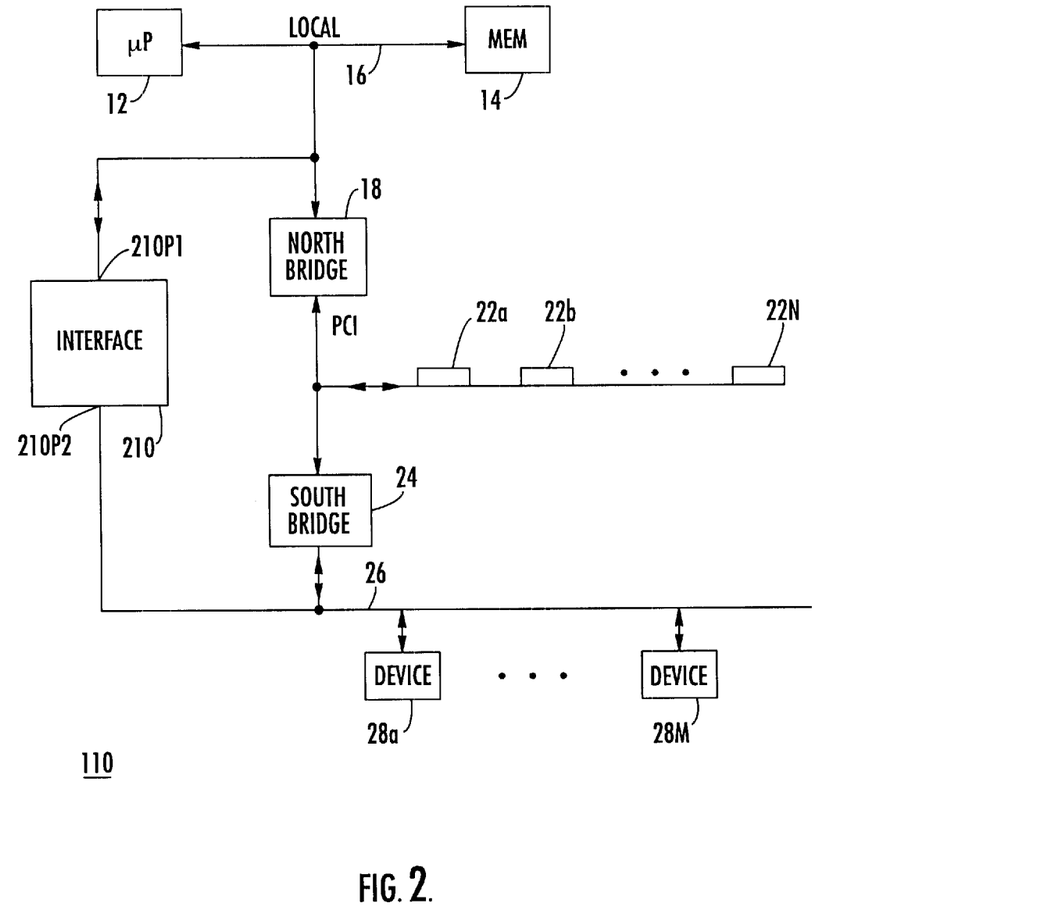
FIG. 2 is a simplified block diagram, similar to that of FIG. 1, showing the interface according to the invention.

In FIG. 2, system 110 differs from system 10 of FIG. 1 by including an interface block 210 in accordance with the invention. Interface 210 is coupled to local bus 16 by way of a parallel port 210P1, which ideally has as many parallel paths as there are operational paths on local bus 16. At the current state of the art, the number of operational data paths or bits on local bus 16 may be $2^6$=64 paths, but 128-bit paths are known, and the bus width may in principle be any integer power of two, namely $2^N$. Interface 210 is also coupled by way of a parallel port 210P2 to device bus 26. Since the local bus also carries address bits and other signals, a "64-bit" bus may actually have many more parallel bits.

Figure 3:
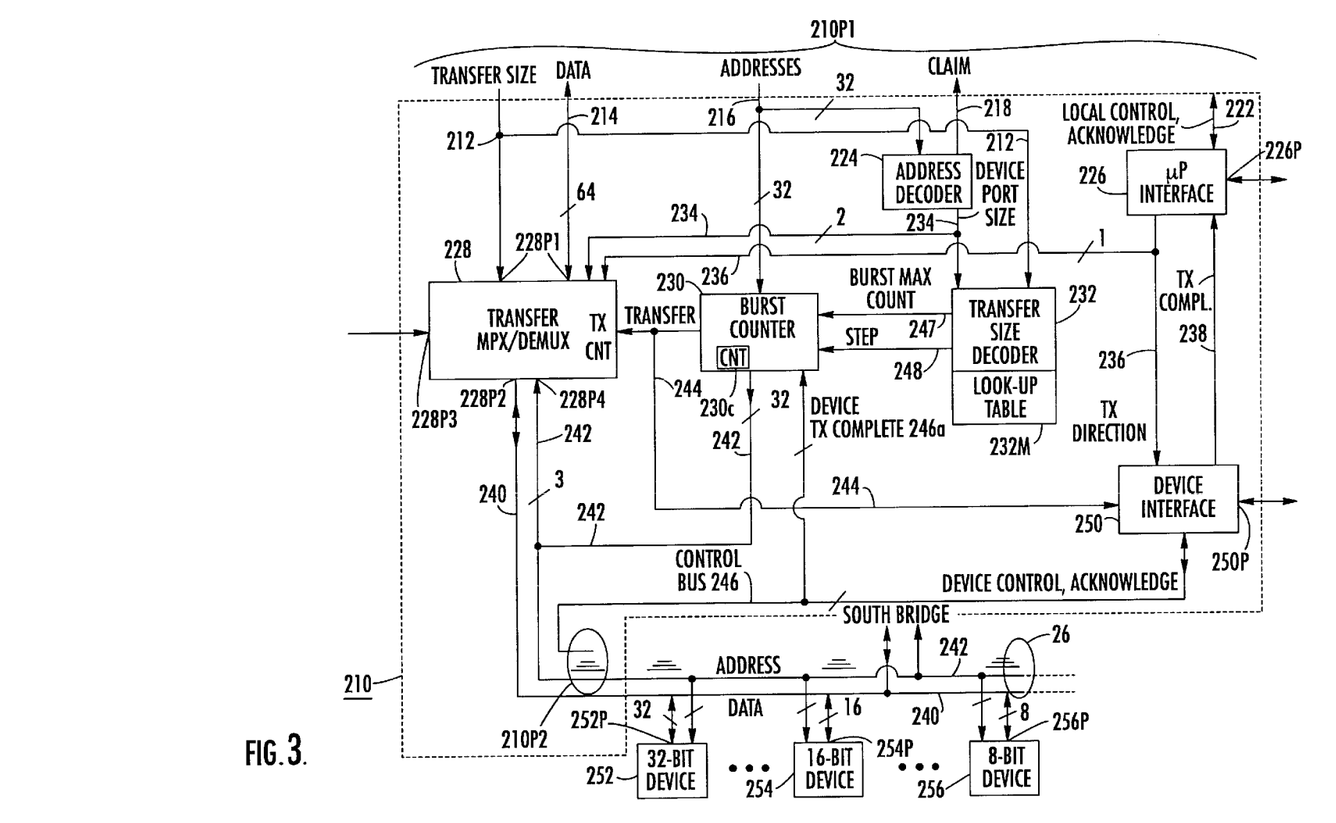
FIG. 3 is a simplified block diagram of the interface of FIG. 2 and some of its associated elements.

FIG. 3 is a simplified block diagram of interface 210 of FIG. 2. In FIG. 3, port 210P1 encompasses a transfer size bus 212, a data bus 214, which in one embodiment of the invention is a 64-bit bus, an address bus 216, which in one embodiment has 32 bits, a "claim" bus 218, and a general control bus 222, which carries signals such as local control signals and transfer acknowledgements.

In FIG. 3, an address decoder 224 receives address signals from the microprocessor by way of bus 216, and decodes each address in sequence. Address decoder 224 determines from the address on the bus if the address represents an address associated with a device attached to the device bus 26. In order to accomplish this task, address decoder 224 includes a memory which is preprogrammed with information relating to the addresses associated with bus devices. Address decoder responds to the input addresses by raising a flag on claim bus 218 whenever its input address represents a device address. The microprocessor (or, more properly, the north bridge 18 of FIG. 2) responds to the claim signal in a manner allowing the microprocessor to produce the desired data, but inhibiting the north bridge from processing the data. Address decoder 224 also produces a device port size signal on a bus 234, which represents the port size of the addressed bus, also extracted from internal memory. The device port size signal is applied by way of bus 234 to a bidirectional transfer multiplexer/demultiplexer (MPX/DEMUX) block 228 and to a transfer size decoder block 232. Port 228P1 of transfer multiplexer/demultiplexer 228 receives transfer size information over bus 212 and data over bus 214 from the local bus 16 by way of port 210P1.

Transfer size decoder block 232 of FIG. 3 receives device port size signals by way of bus 234 from address decoder 224, and also receives transfer size data from the microprocessor local bus by way of bus 212. With information relating to the device port size and the size of the data block or 64-bit word to be transferred, the number of transfers required to transfer the information is readily determined. Transfer size decoder 232 addresses an internal look-up table or memory 232M with the device port size, and extracts preprogrammed information relating to the step size. The step size is simply the number of bytes in the device port width. Since the number of bits which the device can accept (or produce) in any one data transfer is one of 32 bits, 16 bits, or 8 bits at the current state of the art, the internal memory 232M for determination of step size requires only three address bits, to produce on bus 248 the number four in the case of a 32-bit device port, two in the case of a 16-bit device port, and one in the case of an eight-bit port.

Transfer size decoder 232 of FIG. 3 also produces burst maximum (max) count signals on a bus 247 for application to a burst counter 230. The burst max count represents the number of data transfers which must be made on the device bus in order to transfer the block of data. In particular, the burst max count is generated by dividing the data block or transfer size by the device port size. For example, if 64 bits are to be transferred to a 32-bit input port of a device, two device bus transfers are required. Possible values are two, four, or eight, corresponding to 64-bits-to-32, -16, or -8 bits.

Burst counter 230 of FIG. 3 receives addresses (ordinarily 32-bit) by way of bus 216, burst max count signals by way of bus 247, and step size signals by way of bus 248. Burst counter 230 also receives one-bit device transfer (TX) complete signals from the selected one of the devices by way of a branch 246a of a control bus portion 246 of device bus 26. Burst counter 230 produces device addresses in response to its input signals, by first latching the first three least-significant address bits from bus 216 into a three-bit or three-stage counter (cnt), illustrated as 230c. The present contents of the three-bit counter, together with the remaining most-significant-bits of the address, are coupled onto the 32-bit device address bus 242, and routed by way of interface port 210P2 to address portion 242 of device bus 26. Following the application of the three bits in the burst counter and the remaining most-significant-bits to bus 242, a transfer command is generated by burst counter 230 on bus 244 for application to the transfer control (TX CNT) port of transfer MUX/DEMUX 228. The transfer of one subset of the data block is completed by operation of MUX/DEMUX 228, which applies the data from port 228P1 to data portion 240 of device bus 26, by way of port 228P2, for coupling through port 210P2 to the selected device. In FIG. 3, the selected device may be one of a representative 32-bit device 252, which has a 32-bit port 252P coupled to data bus portion 240 of device bus 26, or it may be a representative 16-bit device 254, which has a 16-bit port 254P coupled to data portion 240 of device bus 26, or it may be a representative 8-bit device 256, which has an eight-bit port 256P coupled to data portion 240 of device bus 26. The selected device responds with a device transfer (TX) complete signal, which is coupled by way of control bus portion 246a of device bus 26 back to burst counter 230.

When burst counter 230 of FIG. 3 receives the device tx complete signal from bus 246a following the first transfer of data by MUX/DEMUX 228, the burst counter (a) increments the count by the magnitude of the step signal value, (b) repeats the step of generation of the device address by concatenating or overlaying the new current value of the three least-significant (now-incremented) bits of the counter with the remaining most significant bits of the address for application to the device bus, and (c) generating a transfer command on bus 244. Another data transfer occurs, a device transfer complete signal is received by burst counter 230 over path 246a, and the process is repeated. The repetitions occur for as many transfers as may be required to transfer the input word (64 bits, 32 bits, 16 bits, or 8 bits) to the device, taking its input port width into account, as established by the burst max count value applied to burst counter 230 by way of bus 247. As an example, if the data transfer size is 64 bits and the device port size to which the data is to be transferred is 8 bits, the step size is 1, and the burst max count is 8. This results in eight transfers of information, with the addresses of the device being incremented by unity. On the other hand, if the transfer size is 64 bits and the device port size is 32, the address increment step size is 4, and the burst max count is 2.

In operation of the arrangement of FIG. 3 as so far described, the microprocessor specifies the device addresses to which data is to be transferred from the local bus, and also specifies the device addresses from which data is to be retrieved when operating to transfer data to the microprocessor from the device. In either direction of operation, the burst counter addresses appearing on bus 242 are applied to the appropriate device, to establish the device addresses to be written to or read from, and the same address values are also applied to port 228P4 of MPX/DEMUX 228 to indicate to the multiplexer/demultiplexer which device addresses are read during the current transfer. The identity of the device addresses which are read, in turn, establishes the byte location or address within the 64-bit (or other size) data bus to which the data from a particular device address should be transferred.

At upper right in FIG. 3, a microprocessor ($\mu$P) interface or controller block 226 receives local control signals from local bus 16 by way of port 210P1 and a bus 222, and uses the local control signals, or more specifically the read and write strobes, to determine the data transfer direction signal. The data direction signal is applied to bus 236 for application to transfer MPX/DeMUX 228 and to device interface block 250. Microprocessor interface 226 also receives transfer complete (Tx Comp.) signal from device interface 250, and responds by applying to the local bus (by way of local control acknowledge bus 222 and port 210P1) a local acknowledgement of the transfer. Device interface 250 receives the transfer direction signal over bus 236 and the transfer command from bus 244, and responds by generating a device transfer command on portion 246 of the device bus 26. For this purpose, the device interface 250 requires a memory (not illustrated) in which command characteristics of the various devices are stored. The device commands are coupled from device interface block 250 to the devices 252, . . . , 254, . . . 256 by way of command portion 246 of device bus 26. In addition, device interface 250 receives transfer complete or acknowledgement signals from the devices over control portion 246 of device bus 26. Device interface 250 responds to the transfer complete signals by generating an equivalent signal on Tx complete bus 238 for application to microprocessor interface block 226.

Figure 4:
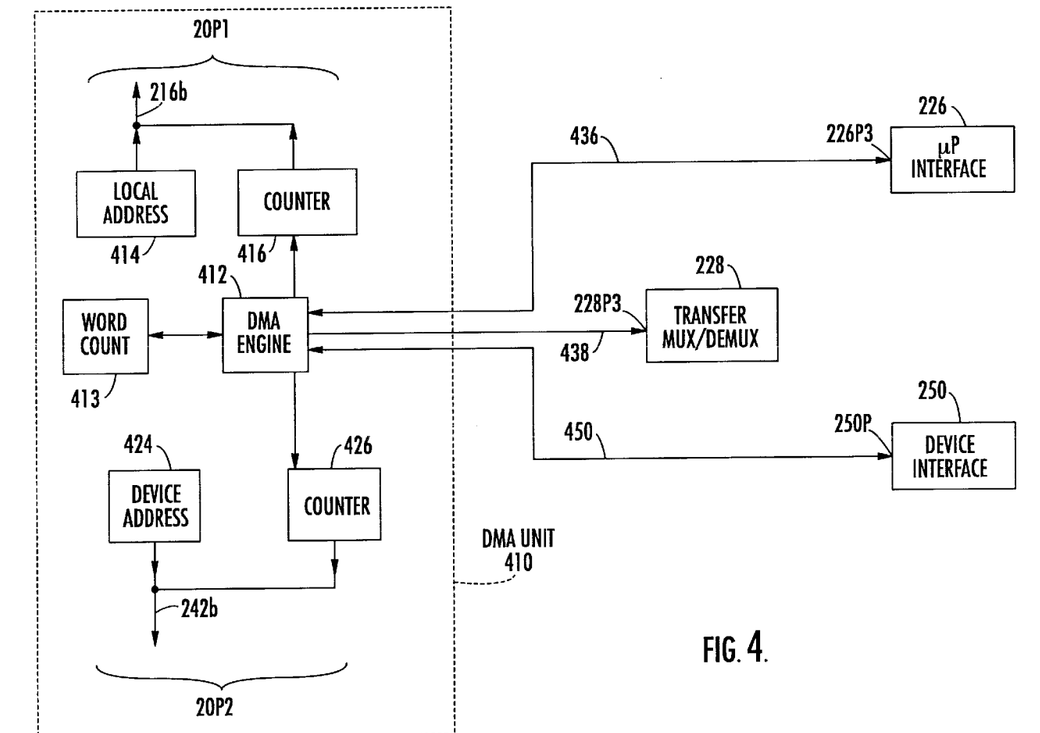
FIG. 4 is a simplified block diagram of a direct memory address (DMA) arrangement which may be used in conjunction with the interface of FIG. 3.

FIG. 4 is a simplified block diagram of a DMA attachment 410 to the interface 210 of FIG. 3. Elements of FIG. 4 corresponding to those of FIG. 3 are designated by like reference numerals. The DMA attachment 410 allows the central processing unit or microprocessor 12 of FIG. 2 to specify a block of addresses in memory 14, the addresses of a block of memory of the same size in a device, and to command transfer of data therebetween in either direction, without further microprocessor intervention. In FIG. 4, a local address register 414 and a counter 416 are coupled to the microprocessor 12 by way of a portion of port 20P1 and a unidirectional portion 216b of the address portion 216 of local bus 16. Similarly, a device address register 424 and a counter 426 are coupled by way of a portion of port 20P2 and a unidirectional bus portion 242b of address portion 242 of device bus 26. A word counter 413 is coupled to a DMA engine 412. DMA engine 412 is coupled by bidirectional paths 436 and 450 to microprocessor interface 226 and to port 250P of device interface 250, respectively. Local address register 414 and device address register 424 can be loaded with addresses, and counters 416 and 426 can be loaded with the lowest B bits of the same addresses, by the microprocessor, by way of paths (not illustrated).

In FIG. 4, word counter 413 is also loaded with a word count by the microprocessor by a path (not illustrated). The word count represents the number of 64-bit words which are to be transferred. The value of the word count in word count block 413 decrements in response to the local control acknowledge signal applied from port 226P3 of microprocessor interface 226, by way of bus 436, to DMA engine 412. In operation, the microprocessor 12 loads a local address, representing the starting address in the block to be transferred, into local address register 414 and simultaneously loads the B least-significant bits of the address into counter 416. The value of B in one embodiment of the invention is ten, where the local address has 32 bits. The first device address of the device block of memory is loaded into device address register 424, and the B least significant bits are loaded into counter 426, in a similar manner. These addresses are made available to the local memory and to the device by way of buses 216*b* and 242*b*, respectively. The word count block 413 is loaded with the number of local transfers, which is the number of transfers of 64-bit words. The microprocessor 12 then supplies a direction of transfer command and a "go" command to the DMA engine 412 to initiate DMA engine operation. DMA engine 412 responds by sending a command over bus 436 to the microprocessor interface 226 to generate the local control strobes to access the local address, and also commands the device interface 250 by way of bus 450 to generate the device strobes to access the device memory at the starting address of the device memory block. The DMA engine 412 then transfers a direction command to transfer MUX/DEMUX 228, and commands one transfer. The DMA engine is then quiescent until it receives the local acknowledge signal from microprocessor interface 226, and the transfer complete signal from device interface 250. These signals indicate that the transfer has caused information to be copied from the source address and overwritten into the receiving memory address. When both acknowledgements have been received, the DMA engine decrements the word count by one, and increments the LSB counts in counters 416 and 426. The incremented addresses now represent the second address in the specified blocks of memory. The DMA engine starts another transfer by again sending commands to the microprocessor interface 226 and the device interface 250 to generate the local and device address strobes, and sends a direction and "go" command the transfer MUX/DEMUX 228. MUX/DEMUX 228 performs the transfer of the second word. Following the transfer of the second word, the acknowledgement and transfer complete signals are generated, to indicate to the DMA engine that another transfer may be started. DMA engine 412 again decrements the word count in register 413 and increments the address counts. A new transfer may then be initiated by the DMA engine. This process continues until the word count reaches zero, thereby indicating that the block of data has been transferred.

The computing or processing system according to the invention thus includes a microprocessor and a memory coupled together by a local bus, and also includes a north bridge providing translation to a PCI or other standard bus. The system also includes a device bus, which may or may not be coupled to the PCI bus by a south bridge. A device bus interface bypasses the north and south bridges, to provide a single-step interface to the device bus. This reduces the latency by more than a 2:1 factor, because the PCI bus operations require substantial time-consuming overhead.

Other embodiments of the invention will be apparent to those skilled in the art. For example, while the south bridge 24 has been illustrated as being connected in a system according to an aspect of the invention, it may be deleted, since the low-latency bypassing interface provides an alternative path having better properties. Thus, the best mode of the invention deletes the south bridge entirely. The inhibiting of the north bridge need not be an express inhibition, but rather may simply result from the use of address regions not decoded by the north bridge.

Thus, an interface arrangement (210) according to the invention is for attaching peripheral devices (252, 254, 256) on a device bus (26) to a microprocessor (12) $2^N$-bit local interface bus (16), where the local interface bus (16) is associated with a north bridge (18) for interfacing a PCI bus (20) to the local interface bus (16), and may also be associated with a south bridge for interfacing the device bus (26) to the PCI bus (20). The interface arrangement (210) includes a transfer multiplexer/demultiplexer (228) having a $2^N$-bit parallel first port (228P1) coupled (by way of port 210P1) to the local interface $2^N$-bit bus (16) for receiving $2^N$-bit data, and for also receiving transfer size information relating to the $2^N$-bit data. The transfer multiplexer/demultiplexer (228) also includes a parallel second port (228P2) having no more than $2^{N-1}$-bits, and further includes a transfer control (TX CNT) input port for transferring data between the first (228P1) and second (228P2) ports in a time-division multiplex manner under the control of a transfer initiate signal applied to the transfer control (TX CNT) input port, a burst count signal, a data direction signal, and a device port size signal. A local bus address decoder (224) is coupled to the local interface bus (16), for receiving the local address from the microprocessor (12) by way of the local interface bus (16), and for decoding the local address to determine if the transfer is to/from a device (252, 254, 256) which is attached to the device bus (26), and if the local address provides access to such a device (252, 254, 256) coupled to the device bus (26), signalling, by way of (claim signal on) the local interface bus (16), to the microprocessor (12) that the local bus address decoder (224) is assuming control of the transfer associated with the local address, and, if the local bus address decoder (224) is handling the transfer, further decoding the local address to determine the accessed width of the port (252P, 254P, 256P) of the device (252, 254, 256), to thereby produce the device port size signals. The interface arrangement (210 further includes a transfer size decoder (232) coupled to the local interface bus (16), for receiving transfer size information relating to the transfer, and also coupled to the local bus address decoder (224) for receiving the port size signals. The transfer size decoder (232) generates a maximum burst count value (on bus 247) in response to the quotient of the transfer size divided by the port size, and also generates a step value (on bus 248) by addressing a look-up table (232M) with the port size, to access prestored values in the look-up table (232M). The prestored values of step size are equivalent to the byte width of the addressed device port. A burst counter (230) is coupled to the transfer control (TX CNT) port of the transfer multiplexer/demultiplexer (228), and (by way of bus 216) to the local interface bus (16) for receiving the local addresses, to the transfer multiplexer/demultiplexer (228), and is also coupled to the transfer size decoder (232), for receiving the maximum burst count and the accessed one of the prestored step values. The burst counter (230) performs the following steps:

(a) loading or latching the three least-significant bits of the local addresses into a counter (230c);

(b) following the loading step, transferring the three bits contained in the counter (230c), in parallel, together with the remaining most-significant bits of the local address, also in parallel, to the device bus (26);

(c) following the transfer of the three bits and the most-significant bits to the device, generating the transfer initiation command for application to (port TX CNT of) the transfer multiplexer/demultiplexer (228);

(d) after generation of the transfer initiation command, incrementing the counter (230c) by the value of the accessed one of the prestored step values; and (e) repeatedly generating another transfer initiation command and again incrementing the counter, for one less than the number of times specified by the maximum burst count (since steps a, b, c, and d represent a first time).

The interface arrangement (210) also includes a local microprocessor (12) controller or interface (226) coupled (by bus 222) to the local bus (16), for receiving at least local read and write strobes. The local microprocessor (12) controller also includes a transfer complete (TX COMP) strobe signal input port. The local microprocessor (12) controller (226) decodes the read and write strobes to generate a data direction signals representing the direction of data flow through the interface arrangement (210), and also generates, on the local interface bus (16), a local acknowledge signal representing completion of data transfer. The interface arrangement further includes a device interface controller (250) coupled (by control portion 246) to the device bus (26) for receiving device transfer acknowledge signals, coupled to the local microprocessor (12) controller (226) for receiving the data direction signals, and also coupled to the burst counter (230) for receiving the transfer initiate signals. The device interface controller (250) drives the device bus (26) with device control signals in response to the direction control and transfer initiate signals, and produces the transfer complete signals (for application to microprocessor interface 226) in response to the device transfer acknowledge signals.

What is claimed is:

1. An interface arrangement for attaching peripheral devices on a device bus to a microprocessor local interface $2^N$-bit bus, where said local interface $2^N$-bit bus is associated with a north bridge for interfacing a PCI bus to said local interface bus, said interface arrangement comprising:

a transfer multiplexer/demultiplexer having a $2^N$-bit bit parallel first port coupled to said local interface $2^N$-bit bus for receiving $2^N$-bit data, and for also receiving transfer size information relating to said $2^N$-bit data, and also including a parallel second port having no more than $2^{N-1}$-bits, and further including a transfer control input port for transferring data between said first and second ports in a time-division multiplex manner under the control of a transfer initiate signal applied to said transfer control input port, a burst count signal, a data direction signal, and a device port size signal;

a local bus address decoder coupled to said local bus, for receiving the local address from said microprocessor by way of said local bus, and for decoding said local address to determine if the transfer is to/from a device which is attached to said device bus, and if said local address provides access to such a device coupled to said device bus, signalling, by way of said local bus, to said microprocessor that said local bus address decoder is assuming control of the transfer associated with said local address, and, if said local bus address decoder is handling said transfer, further decoding said local address to determine the accessed width of the port of said device, to thereby produce said device port size signals;

a transfer size decoder coupled to said local bus, for receiving transfer size information relating to the transfer, and also coupled to said local bus address decoder for receiving said port size signals, for generating a maximum burst count value in response to the quotient of said transfer size divided by said port size, and for generating a step value by addressing a look-up table with said port size, to access prestored values in said look-up table, said prestored values of step size being equivalent to the byte width of said device port;

a burst counter coupled to said transfer control port of said transfer multiplexer/demultiplexer, to said local bus for receiving said local addresses, to said transfer multiplexer/demultiplexer, and also coupled to said transfer size decoder, for receiving said maximum burst count and the accessed one of said prestored step values, for
   (a) loading the three least-significant bits of said local addresses into a counter;
   (b) following said loading step, transferring the three bits contained in the counter, in parallel, together with the remaining most-significant bits of the local address, also in parallel, to the device bus;
   (c) following the transfer of said three bits and said most-significant bits to said device, generating said transfer initiation command for said transfer multiplexer/demultiplexer;
   (d) after generation of said transfer initiation command, incrementing the counter by the value of said accessed one of said prestored values; and
   (e) generating another transfer initiation command and again incrementing said counter, for one less than the number of times specified by said maximum burst count;

a local microprocessor controller coupled to said local bus, for receiving at least local read and write strobes, said local microprocessor controller including a transfer complete strobe signal input port, said local microprocessor controller being for decoding said read and write strobes to generate a data direction signal representing the direction of data flow through said interface arrangement, and for generating on said local bus a local acknowledge signal representing completion of data transfer;

a device interface controller coupled to said device bus for receiving device transfer acknowledge signals, and coupled to said local microprocessor controller for receiving said data direction signals, and also coupled to said burst counter for receiving said transfer initiate signals, said device interface controller being for driving said device bus with control signals in response to said direction control and transfer initiate signals, and for producing said transfer complete signals in response to said device transfer acknowledge signals.

2. An interface arrangement according to claim 1, wherein said local microprocessor controller and said device interface controller each include a DMA engine port, and further comprising a DMA engine direct memory transfer external to said microprocessor.

* * * * *

UNITED STATES PATENT AND TRADEMARK OFFICE
CERTIFICATE OF CORRECTION

PATENT NO.    : 6,463,483 B1                                      Page 1 of 1
DATED         : October 8, 2002
INVENTOR(S)   : Steven Robert Imperiali It is certified that error appears in the above-identified patent and that said Letters Patent is hereby corrected as shown below:

<u>Title page, Item [54] and Column 1, lines 1-2,</u>
Title of the invention should read:
-- INTERFACE FOR ATTACHING PERIPHERAL DEVICES ON A DEVICE BUS TO A MICROPROCESSOR LOCAL INTERFACE BUS WHICH IS ASSOCIATED WITH A NORTH BRIDGE --

Signed and Sealed this

Twenty-fifth Day of March, 2003

JAMES E. ROGAN
*Director of the United States Patent and Trademark Office*